(12) United States Patent
Yang et al.

(10) Patent No.: US 9,208,437 B2
(45) Date of Patent: Dec. 8, 2015

(54) PERSONALIZED INFORMATION PUSHING METHOD AND DEVICE

(71) Applicant: Alibaba Group Holding Limited, George Town (KY)

(72) Inventors: Zhixiong Yang, Hangzhou (CN); Zhonghua Deng, Hangzhou (CN); Ningjun Su, Hangzhou (CN)

(73) Assignee: Alibaba Group Holding Limited (KY)

( * ) Notice: Subject to any disclaimer, the term of this patent is extended or adjusted under 35 U.S.C. 154(b) by 84 days.

(21) Appl. No.: 13/714,027

(22) Filed: Dec. 13, 2012

(65) Prior Publication Data

US 2013/0166488 A1    Jun. 27, 2013

(30) Foreign Application Priority Data

Dec. 16, 2011    (CN) .......................... 2011 1 0424664

(51) Int. Cl.
| | |
|---|---|
| *G06N 5/00* | (2006.01) |
| *G06F 1/00* | (2006.01) |
| *G06N 5/02* | (2006.01) |
| *G06F 17/30* | (2006.01) |
| *G06Q 30/06* | (2012.01) |

(52) U.S. Cl.
CPC ............ *G06N 5/02* (2013.01); *G06F 17/30867* (2013.01); *G06Q 30/0631* (2013.01)

(58) Field of Classification Search
CPC ........... G06N 5/02; G06N 5/04; G06N 5/022; G06F 19/03
See application file for complete search history.

(56) References Cited

U.S. PATENT DOCUMENTS

| | | |
|---|---|---|
| 5,754,938 A | 5/1998 | Herz et al. |
| 5,754,939 A | 5/1998 | Herz et al. |

(Continued)

FOREIGN PATENT DOCUMENTS

| | | |
|---|---|---|
| CN | 101079064 | 11/2007 |
| JP | 2001236405 | 8/2001 |

(Continued)

OTHER PUBLICATIONS

Kim et al., "A preference scoring technique for personalized advertisements on Internet storefronts", Mathematical and Computer Modeling, vol. 44, No. 1-2, Jul. 1, 2006. pp. 3-15.

(Continued)

*Primary Examiner* — Jeffrey A Gaffin
*Assistant Examiner* — Kalpana Bharadwaj
(74) *Attorney, Agent, or Firm* — Van Pelt, Yi & James LLP

(57) ABSTRACT

Embodiments of the present application relate to a personalized information pushing method, a personalized information pushing device, and a computer program product for pushing personalized information. A personalized information pushing method is provided. The method includes retrieving network behavior data related to access operations performed by user terminals, determining a numerical value of a degree of correlation between a user terminal and a plurality of information providing terminals having a correlation within a set time window based on the network behavior data, retrieving information providing terminals corresponding to a first user terminal to form a first data set based on the numerical values, retrieving information of the information providing terminals from the first data set to generate a first information, and pushing the first information to the first user terminal.

17 Claims, 7 Drawing Sheets

(56) References Cited

U.S. PATENT DOCUMENTS

| | | |
|---|---|---|
| 5,835,087 A | 11/1998 | Herz et al. |
| 6,029,195 A | 2/2000 | Herz |
| 6,195,657 B1 | 2/2001 | Rucker et al. |
| 6,236,990 B1 | 5/2001 | Geller et al. |
| 6,606,624 B1 | 8/2003 | Goldberg |
| 7,089,237 B2 | 8/2006 | Turnbull et al. |
| 7,181,488 B2 | 2/2007 | Martin et al. |
| 7,320,020 B2 | 1/2008 | Chadwick et al. |
| 7,606,772 B2 | 10/2009 | Flinn et al. |
| 7,676,400 B1 | 3/2010 | Dillon |
| 7,836,051 B1 | 11/2010 | Mason |
| 8,645,409 B1 | 2/2014 | Garg et al. |
| 8,898,283 B2 | 11/2014 | Zhang et al. |
| 2001/0049623 A1 | 12/2001 | Aggarwal et al. |
| 2003/0005113 A1 | 1/2003 | Moore |
| 2004/0044677 A1 | 3/2004 | Huper-Graff et al. |
| 2005/0289140 A1 | 12/2005 | Ford et al. |
| 2006/0041550 A1 | 2/2006 | Bennett et al. |
| 2006/0069616 A1 | 3/2006 | Bau |
| 2006/0111833 A1* | 5/2006 | Feldman et al. ............... 701/117 |
| 2006/0288038 A1 | 12/2006 | Zheng et al. |
| 2007/0061195 A1 | 3/2007 | Liu et al. |
| 2007/0233730 A1 | 10/2007 | Johnston |
| 2007/0239535 A1 | 10/2007 | Koran et al. |
| 2008/0004884 A1 | 1/2008 | Flake et al. |
| 2008/0033939 A1 | 2/2008 | Khandelwal et al. |
| 2008/0120129 A1 | 5/2008 | Seubert et al. |
| 2008/0201311 A1 | 8/2008 | Ertugrul et al. |
| 2009/0006207 A1 | 1/2009 | Datar et al. |
| 2009/0063284 A1 | 3/2009 | Turpin et al. |
| 2009/0083362 A1 | 3/2009 | Svendsen |
| 2009/0106221 A1 | 4/2009 | Meyerzon et al. |
| 2009/0281870 A1 | 11/2009 | Sun et al. |
| 2010/0114587 A1 | 5/2010 | Masuyama et al. |
| 2010/0235351 A1 | 9/2010 | Iwasa et al. |
| 2010/0262692 A1 | 10/2010 | Zhang et al. |
| 2010/0293034 A1 | 11/2010 | Olejniczak et al. |
| 2011/0264736 A1 | 10/2011 | Zuckerberg et al. |
| 2012/0047148 A1 | 2/2012 | Guo et al. |
| 2012/0095837 A1 | 4/2012 | Bharat et al. |
| 2012/0254099 A1* | 10/2012 | Flinn et al. ...................... 706/52 |
| 2013/0055145 A1* | 2/2013 | Antony et al. ................ 715/781 |

FOREIGN PATENT DOCUMENTS

| | | |
|---|---|---|
| JP | 2001265767 | 9/2001 |
| JP | 2002007873 | 1/2002 |
| JP | 2002063303 | 2/2002 |
| JP | 2002108918 | 4/2002 |
| JP | 2003058672 | 2/2003 |
| JP | 2003150835 | 5/2003 |
| JP | 2006012115 | 1/2006 |
| JP | 2007140841 | 6/2007 |
| JP | 2007318364 | 12/2007 |
| JP | 2008305037 | 12/2008 |
| JP | 2009508275 | 2/2009 |
| JP | 2010108082 | 5/2010 |
| WO | 2010011603 | 1/2010 |
| WO | 2011076070 | 6/2011 |

OTHER PUBLICATIONS

Forsati et al., "Web Page Personalization Based on Weighted Association Rules", 2009 International Conference on Electronic Computer Technology, Feb. 20, 2009, pp. 130-135.

* cited by examiner

PERSONALIZED INFORMATION PUSHING METHOD AND DEVICE

CROSS REFERENCE TO OTHER APPLICATIONS

This application claims priority to People's Republic of China Patent Application No. 201110424664.7 entitled A PERSONALIZED INFORMATION PUSHING METHOD AND DEVICE filed Dec. 16, 2011 which is incorporated herein by reference for all purposes.

FIELD OF INVENTION

This application relates to personalized information pushing method and device.

BACKGROUND OF THE INVENTION

Existing merchandise marketing websites often use keywords recently searched by a user to recommend sellers to the user. For example, based on the keywords entered into a search engine to look up matching sellers, the websites will use those keywords to recommend sellers to the user.

The above recommendation method is relatively simple, which can make it difficult for the recommendation method to satisfy the goals of sellers, buyers and operators. For example, often the most popular products are recommended to buyers, or sellers that a buyer is already familiar with are recommended more frequently than other sellers because when the buyer and the seller have already had previous contact, a higher probability exists that another transaction will occur than for recommendations where the buyer and the seller have had no previous contact.

In addition, with the recommendation method described above, keywords cannot be used if the user has not conducted any searches recently. In order to provide seller recommendations to as many users as possible, a large volume of search data over a long period of time needs to be available. The large volume of search data requires the usage of a large amount of system memory.

Furthermore, even if the buyer has recently searched related content, providing seller recommendations to the user while the user is browsing, completing a transaction or bookmarking a specific product, involves extracting keywords and performing searches extemporaneously. During extemporaneous extraction of keywords for searching, the extraction of the keywords requires time, and also performing search operations using the extracted keywords require an analysis of all of the user's behavior data. Accordingly, the extracting and the performing operations require a very large computational load, have low computational efficiency, and the computed results tend to have low accuracy.

BRIEF DESCRIPTION OF THE DRAWINGS

Various embodiments of the invention are disclosed in the following detailed description and the accompanying drawings.

DETAILED DESCRIPTION

Figure 1:
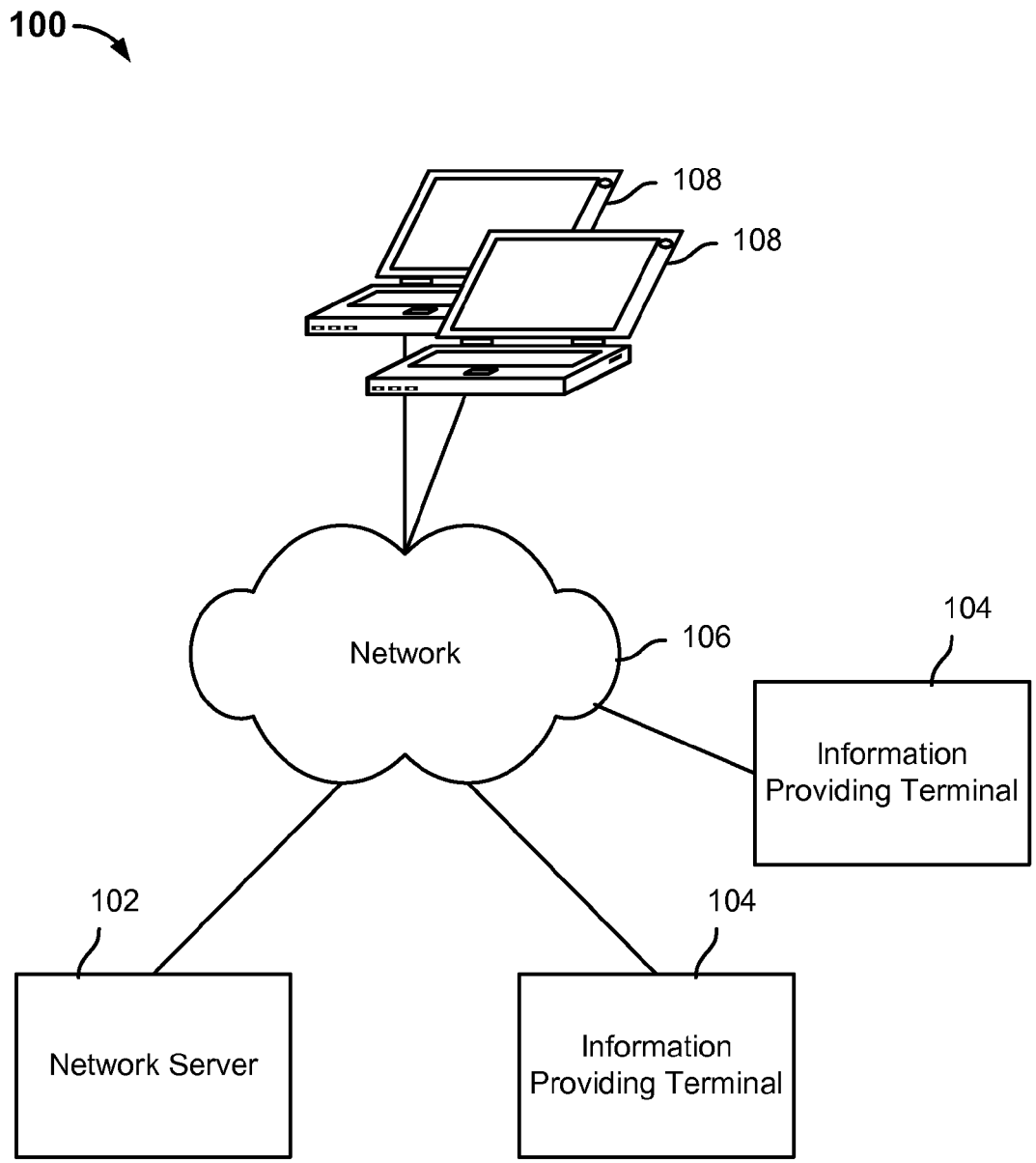
FIG. 1 is a diagram of an embodiment of a personalized information pushing system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The embodiments of the present application disclose personalized information pushing method and device. The method includes: When multiple user terminals are accessing information provided by multiple information providing terminals and stored on a network server, retrieving the network behavior data from access operations performed by the plurality of user terminals, determining a numerical value of the degree of correlation between each user terminal and each information providing terminal having a correlation within a set time window based on the network behavior data; retrieving a plurality of information providing terminals corresponding to a first user terminal to form a first data set S1 based on the numerical values of the degrees of correlation between the first user terminal and the information providing terminals within a set time window; retrieving information of the plurality of information providing terminals from the first data set in sequence according to the size of the numerical values of the degrees of correlation to generate a first information; and pushing the first information to the first user terminal.

FIG. 1 is a diagram of an embodiment of a personalized information pushing system. The system 100 includes a network server 102, a plurality of information providing terminals 104, and a plurality of user terminals 108 each connected via a network 106.

The network server 106 stores information provided by the plurality of information providing terminals 104. For example, the information provided by the plurality of information providing terminals may be commodity information. The plurality of information providing terminals 104 may be used by vendors who sell commodities through the Internet. The network server 106 retrieves network behavior data from access operations performed by the plurality of user terminals, and determines a numerical value of a degree of correlation between each user terminal and each information providing terminal having a correlation with respect to the each user terminal within a set time window based on the network behavior data. Subsequently, the network server 106 retrieves a plurality of information providing terminals corresponding to a first user terminal to form a first data set S1 based on the numerical values of the degrees of correlation between the first user terminal and the information providing terminals within a set time window. Then, the network server 106 retrieves information of the plurality of information providing terminals from the first data set in sequence according to size of the numerical values of the degrees of correlation to generate a first information. The first information is pushed to the first user terminal.

Figure 2:
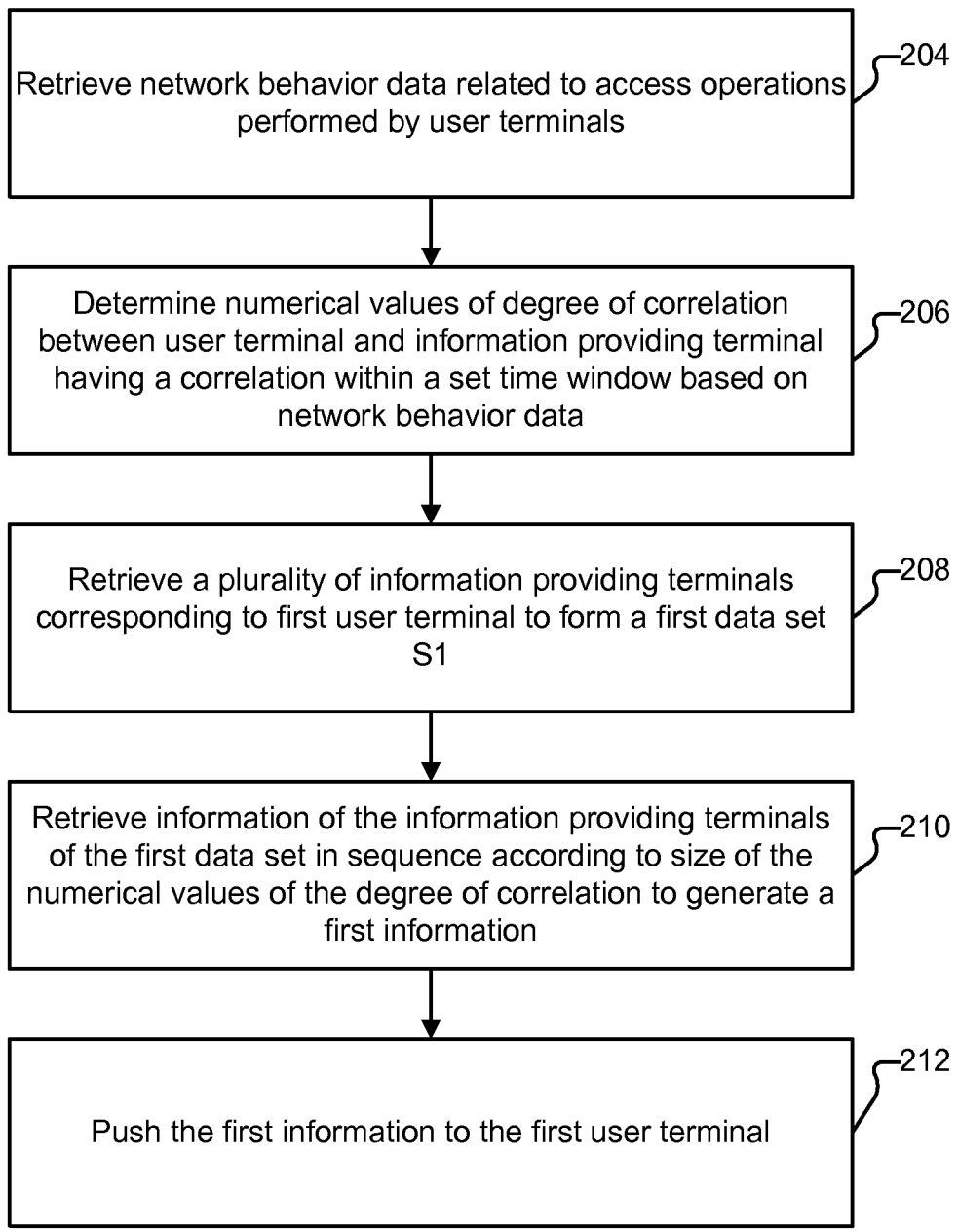
FIG. 2 is a flowchart of an embodiment of a personalized information pushing method.

FIG. 2 is a flowchart of an embodiment of a personalized information pushing method. The method 200 can be implemented in, for example, the system 100. As shown in FIG. 2, the specification discloses a personalized information pushing method. The method 200 includes the following steps:

A plurality of information providing terminals stores information on a network server. The stored information can be accessed by a plurality of user terminals. The information providing terminals can relate to a vendor or provider of a specific commodity. The information can be understood as information pertaining to a good or commodity sold by the vendor.

In step 204, the network server retrieves network behavior data related to access operations performed by the plurality of user terminals. The access operations include specific acts of browsing of the goods, purchasing the goods, etc. These access operations would result in the corresponding network behavior data.

In step 206, the network server determines a numerical value of the degree of correlation between at least one user terminal and at least one information providing terminal having a correlation within a set time window based on the network behavior data. In some embodiments, the network server determines the numerical value of the degree of correlation between each user terminal and each information providing terminal having a correlation within a set time window based on the network behavior data.

In step 208, the network server retrieves a plurality of information providing terminals corresponding to a first user terminal to form a first data set S1 based on the numerical values of the degrees of correlation between the first user terminal and the information providing terminals within the set time window. In some embodiments, the information providing terminals relate to suppliers of goods. For example, for a specific user terminal, numerical values of the degrees of correlation corresponding to all the information providing terminals are calculated. Subsequently, the degrees of correlations are sorted from the largest to the smallest value. The information providing terminals having the largest degrees of correlation are used to generate the first data set S1. The first data set S1 includes a plurality of information providing terminals. In some embodiments, the first data set S1 can include the plurality of information providing terminals for each user terminal.

In step 210, the network server retrieves information relating to the plurality of information providing terminals from the first data set in sequence based on the size of the numerical values of the degrees of correlation to generate first information. For example, the information relates to the information providing terminals that are recommended to the user terminal.

In step 212, the network server pushes the first information to the first user terminal in sequence based on the size of the numerical values of the degrees of correlation.

Figure 3:
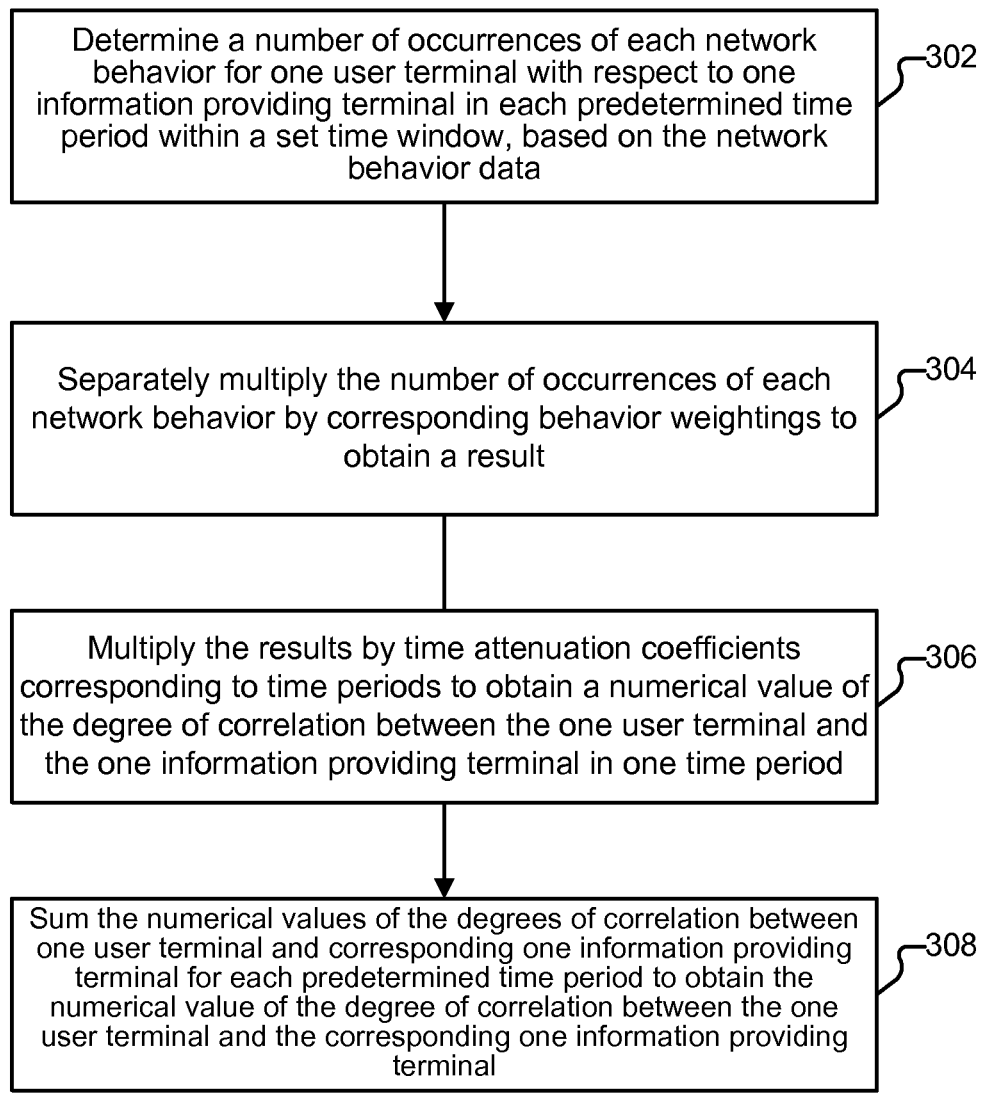
FIG. 3 is a flowchart of an embodiment of a method of determining the numerical value of the degree of correlation.

As shown in FIG. 3, the determining of the numerical value of the degree of correlation between at least one user terminal and at least one information providing terminal having a correlation within a set time window based on the network behavior data, the method 300 includes the following steps:

In step 302, the network server determinates a number of occurrences of each network behavior of one user terminal with respect to each associated information providing terminal in each predetermined time period within a set time window based on the network behavior data.

For example, in the context of providing of related shop information and product information by an online store, the user terminals correspond with end user equipment that performs operations associated with the online store, and the information providing terminals correspond with terminals providing the shop information. Shop information can include shop name, contact information, information about the products and the sellers, etc. Product information can include product name, description, price, etc. Network behavior includes transaction behavior, bookmarking actions, contact behavior (e.g., sending email, communicating by instant messenger, etc.), acts of browsing the shop's products, and the like. For each user terminal and information providing terminal pair, the behavior data for each information providing terminal and each user terminal having a correlation is identified. The term "having a correlation" means that a network behavior operation exists between the user terminal and the information providing terminal. For example, a user through the use of the user terminal has purchased a product from a shop whose information is provided by a specific information providing terminal. Of course, the present application is not limited to the providing of related shop information and product information by online stores. The present application can also be applied to the provision of video information by video websites or various other types of information providing platforms.

In step 304, the numbers of occurrences of each network behavior are separately multiplied by corresponding behavior weightings to obtain corresponding results. For example, although transaction behavior and browsing behavior both reflect a user's degree of attention, the degrees of attention demonstrated based on different types of network behavior are not the same. Therefore, separate settings are made for corresponding behavior weightings w1, w2, w3, w4, etc.

In step 306, the results are multiplied by a time attenuation coefficient corresponding to the each time period to obtain a numerical value of the degree of correlation between the one user terminal and the one information providing terminal. The time attenuation coefficient may be calculated from actual prior data. For example, the time attenuation coefficient can be 0.926.

In step 308, the network server sums the numerical values of the degrees of correlation between the one user terminal and the one information providing terminal for each predetermined time period within a time window to obtain the numerical value of the degree of correlation between the one user terminal and the corresponding one information providing terminal.

Because a storage capacity of server equipment is limited, setting the time window used for computations is based on actual requirements. In some embodiments, the time window is user configurable. For example, the time window can be set to within the last 30 days, 60 days or 90 days based on a data retention period. All of the stored behavior data within the set time window can be included in the computations.

Figure 4:
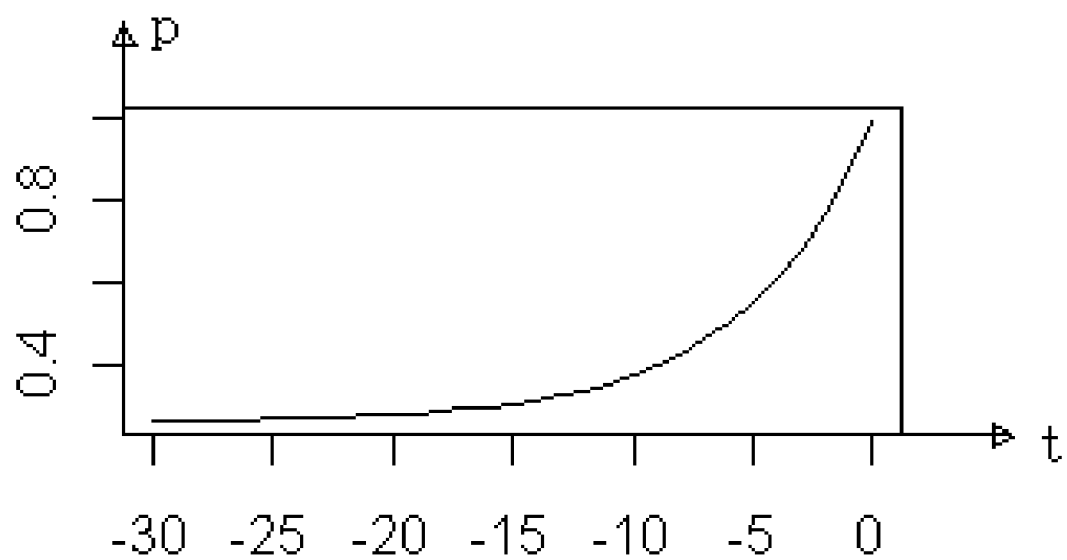
FIG. 4 is a schematic diagram of an attenuation trend in preference P after t number of days.

FIG. 4 is a schematic diagram of an attenuation trend in preference P after t number of days. Because user preferences generally attenuate over time, the fact that a user currently likes or prefers a certain category does not guarantee that the user will still like or prefer the category after a month. The influence on behavior of a user's preference from 30 days prior is not as great as the influence on the behavior of the user's preferences in the most recent few days. The attenuation trend for preference P after t number of days is expressed using an index model, as depicted in FIG. 4.

For example, the index model relates to $$P(t)=K_1+\exp((t-K_2)/K_3), t\leq 0, \quad (1)$$

where t number of days corresponds to a negative number.

Parameters $K_1$, $K_2$ and $K_3$ can be adjusted according to the application scenario and differences in data. For example, $K_1$, $K_2$ and $K_3$ can be set to the following values: $K_1=0.26$, $K_2=1.656$, and $K_3=5.368$.

Because the duration of the time window is relatively long, the duration of the time window, therefore, corresponds to a significant number of different attenuation coefficients. Thus, in some embodiments, the time window can be further divided into a plurality of computation time periods (e.g., 1 day, 5 days, 7 days, or 10 days) with one time attenuation coefficient corresponding to each computation time period. For example, the time period can be set to 30 days, 60 days, or 90 days. The time period can be adjusted based on actual experience.

The relationship between the time attenuation coefficients and the computation time periods is that the greater the length of the time interval between the computation time period and the current time, the smaller the corresponding time attenuation coefficient. Accordingly, the greater the computation time period is away from the current computation time, the greater the time attenuation. In other words, the greater the time attenuation, the smaller the value of the time attenuation coefficient. For example, within 60 days, as the computation time window increases, the value of the time attenuation coefficient decreases gradually from 1 to 0.01, and the computation time period is 1 day. Thus, the time attenuation coefficient a=0.9261 is equivalent to decreasing from 1 to 0.01 in 60 days.

The degree of user preference represented by different behaviors varies. For example, assuming there is a total of n behaviors, and the cumulative total of a user's number of occurrences of each behavior relating to a certain category is $X_1, \ldots, X_n$, respectively. Thus, the preference for the category expressed by this user on this day is $$Y=W_1X_1+\ldots+W_nX_n \quad (2)$$

Preferences of buyers and preferences of sellers are computed separately. Examples of categories include women's clothing, men's clothing, cell phones, etc.

The current weighting for each behavior is determined based on a degree of correlation corresponding to each behavior in an actual application. The weighting relates to a value of W. An example of a weighting with respect to a behavior is illustrated in Table 1:

TABLE 1

| Behavior | Weighting |
|---|---|
| Browsing | W1 |
| Bookmarking | W2 |
| Transaction | W3 |
| . . . | . . . |

In a specific application, the weighting for each behavior is illustrated in Table 2:

TABLE 2

| Behavior Number | Behavior Type | Target Object | Behavior Weighting |
|---|---|---|---|
| 1 | Click-browsing | Offer | 1 |
| 2 | Website comments | Offer | 3 |
| 3 | Leaving Trade Manager message | Offer | 3 |
| 4 | Clicking contact information | Offer | 2 |
| 5 | Bookmarking | Offer | 5 |
| 6 | Placing order | Offer | 10 |
| 7 | Buyer payment | Offer | 5 |
| 8 | Refund (request) | Offer | −12 |

In Table 2, the target object relating to Offer corresponds to product information. For example, the target object can be a product, a category, or a supplier.

In order to determine the weightings of the various behaviors and the time attenuation of user preferences, assume that the user preferences for a certain category expressed by the user's behavior over the last N days are $Y_1, \ldots, Y_n$, and the respective values of the time attenuation function for these N days are $P(0), \ldots, P(-N)$. Then, the user's preference value with respect to this category is $P(0)Y_{0+} \ldots +P(-N)Y_n$.

This is expressed as:

$$Y(\text{catid})=\Sigma y(\text{catid,date})*P(\text{date}-\text{now}) \quad (3)$$

Each result of y( ) and P( ) relates to a certain category. y( ) and P( ) corresponds to equations (1) and (2), respectively. Thus, all user behavior with respect to products can be attributed to certain categories. The catid relates to an ID of the category, or a category ID number. The product is a physical product. More specifically, the product is an offer. For example, the product relates to a class, and the offer relates to an object of the class.

In some embodiments, it is assumed that a user's interest in a category corresponds to a series of behaviors on the website. These behaviors include browsing detailed pages of product information under a certain category, viewing a counterpart's contact information via a product information page, leaving a Trade Manager message or system message for the counterpart via the product information page, posting product information under a certain category, generating an order relating to the product information under a certain category, and the like. The behavior of buyers and the behavior of sellers are distinguished based on the nature of the product information.

For example, the buyer can purchase goods or save them for later purchase. Because the goods can belong to different categories, preference values of the buyer can be calculated with respect to the different categories based on the above method. On the other hand, the seller can list goods of different categories. Based on formula (1), the seller's preference categories can be calculated.

Figure 5:
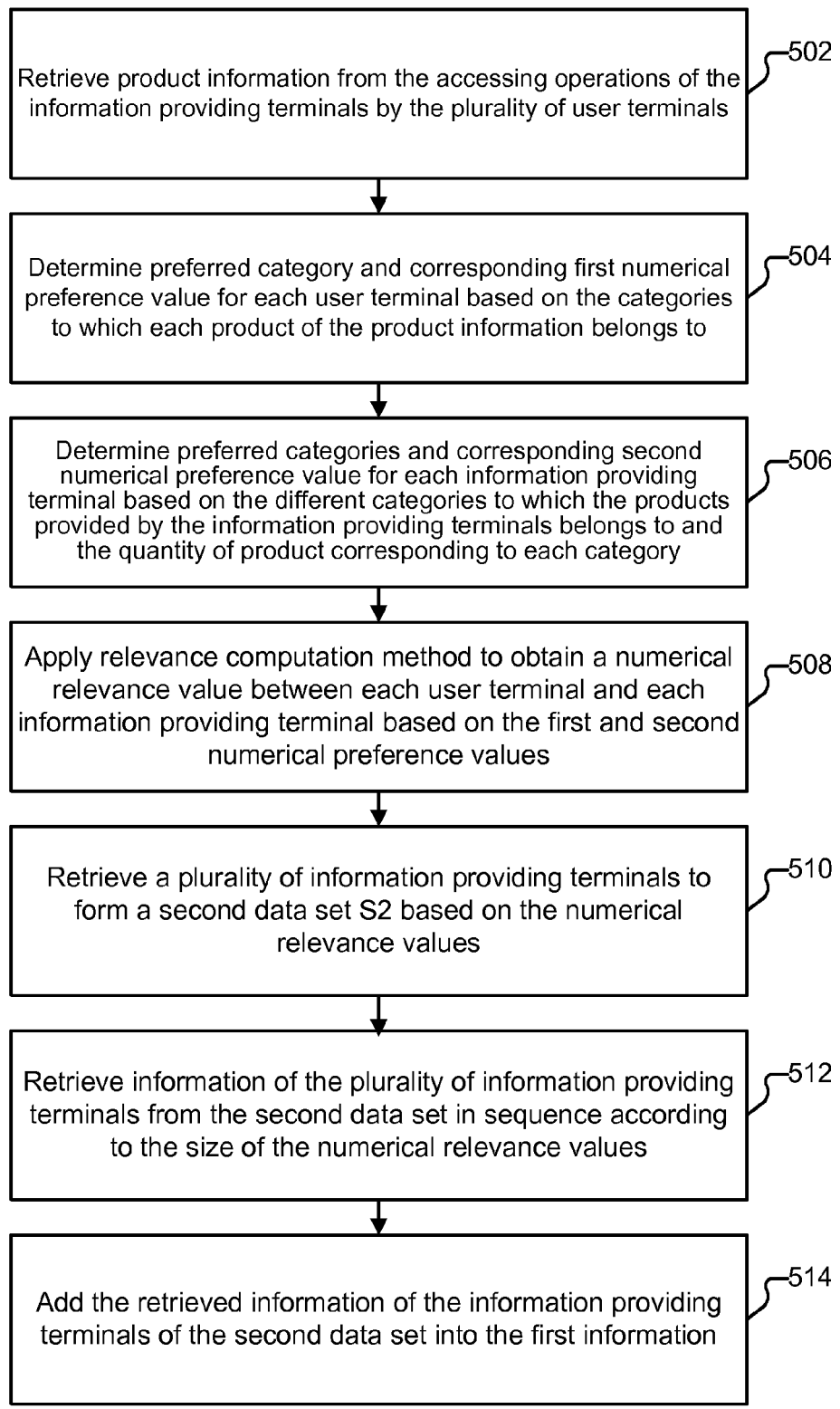
FIG. 5 is a flowchart of an embodiment of a method of retrieving the second data set.

FIG. 5 is a flowchart of an embodiment of a method of retrieving the second data set. In order to refer to the preferences of user terminals and information providing terminals, before the retrieved first information is pushed to the first user terminal, as shown in FIG. 5, the method includes the following steps:

In step 502, the network server retrieves product information relating to the information providing terminals accessed by the plurality of user terminals. In some embodiments, the product information is provided by information providing terminals used by sellers who sell products online. The product information can be stored on the network server and can be accessed or purchased by user terminals through the Internet.

In step 504, the network server determines preferred categories and corresponding first numerical preference values for each user terminal based on the categories that each product belongs to. In other words, the user's behavior eventually determines the preference value of the category.

In step 506, the network server determines the preferred categories and corresponding second numerical preference values for each information providing terminal based on the different categories to which the products provided by the information providing terminals belong to and the quantities of products corresponding to each category.

In step 508, the network server applies a known correlation computation method to obtain a numerical relevance value for each user terminal and each information providing terminal based on the first numerical preference values and the second numerical preference values.

In step 510, the network server retrieves a plurality of information providing terminals to form a second data set S2 based on the first and second numerical relevance values.

For example, for a buyer (e.g. user terminal), a set of preference values can be calculated for various categories, for example, (cat1, value1), (cat2, value2), (cat3, value3), . . . (catn, valuen). Also, a set of preference values can be calculated for the seller (e.g. information providing terminal), for example, (Cat1, value1), (cat2, value2), (Cat3, value3), . . . , (Catn, Valuen). Based on the known correlation computation method, the correlation of each user (buyer) with respect to each seller can be calculated based on the buyer's preference value set and the seller's preference value set.

In step 512, the network server retrieves information of the plurality of information providing terminals in sequence from the second data set according to the size of the first and second numerical relevance values.

In step 514, the network server adds the retrieved information of the information providing terminals from the second data set into the first information.

Figure 6:
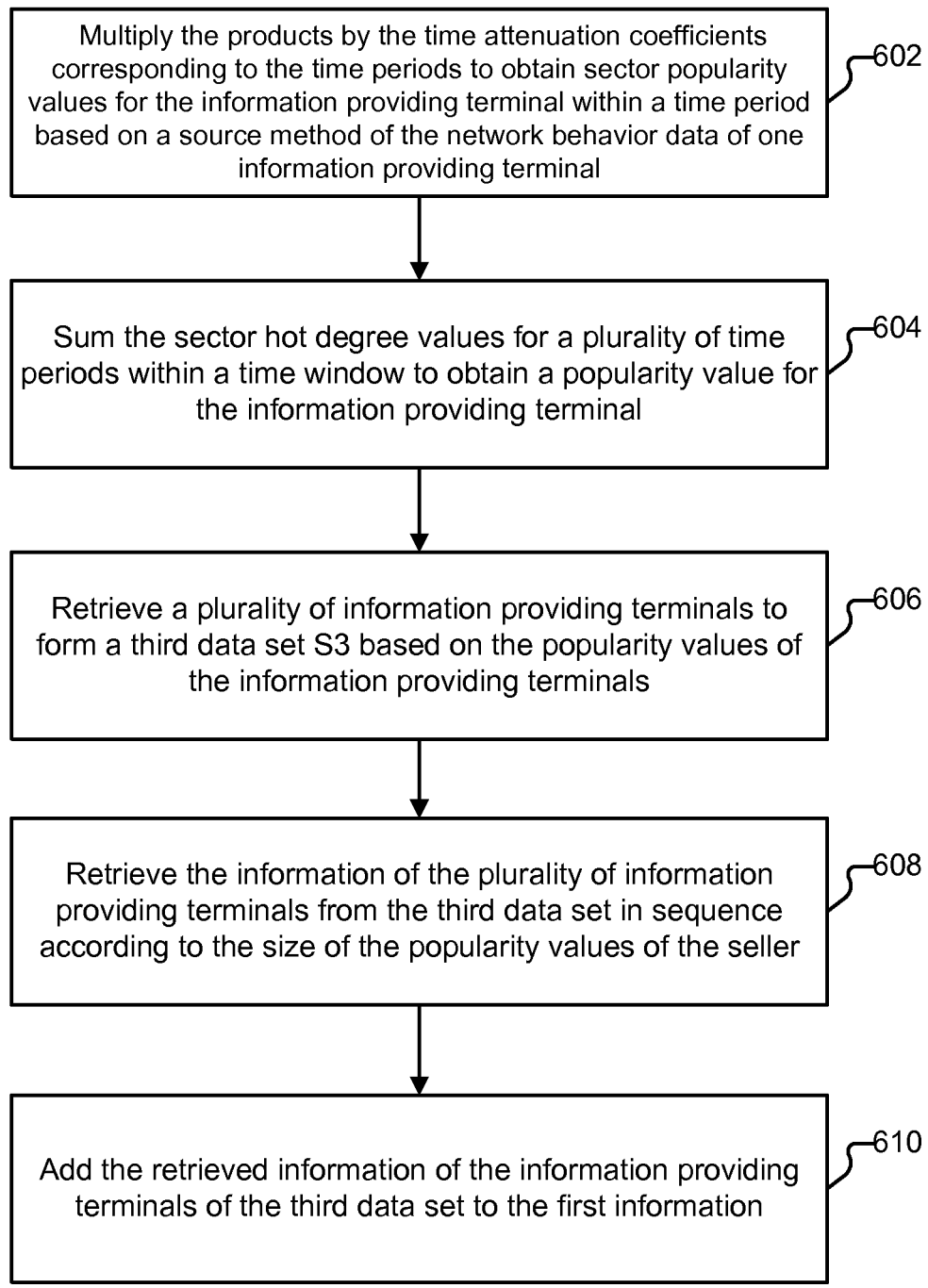
FIG. 6 is a flowchart of an embodiment of a method of retrieving the third data set.

FIG. 6 is a flowchart of an embodiment of a method of retrieving the third data set. In a specific application, a shop's popularity value will also affect the selection of user terminals. Therefore, in the event that related information is recommended to user terminals, shop popularity values are considered. Therefore, before the retrieved first information of the information providing terminals of the first data set is pushed to the first user terminal, as shown in FIG. 6, the method further comprises:

In step 602, after separately multiplying the number of occurrences of network behaviors by the corresponding behavior weightings to obtain a result, the network server multiplies the results by the time attenuation coefficients corresponding to the time periods to obtain sector popularity values for the information providing terminal within a time period based on a source method of the network behavior data of one information providing terminal.

In some embodiments, the network behavior data is the user's behavior operation data with respect to the product information provided by the information providing terminal and with respect to the shop as a whole. For example, a user (buyer) browsed a product information provided by the information providing terminal, or a user (buyer) browsed a shop including all the product information provided by the information providing terminal, the two kind of browsing is different. Thus, the sources of the corresponding network behavior data are not the same. Therefore, during a specific application, the method 600 can be implemented in the following manner:

Popularity values are computed for each product. Subsequently, for each seller, the popularity values for each product relating to the corresponding seller are summed. The sum is expressed as popularity_goods.

Referring to the computation method for popularity values for a product, the popularity value of the seller's shop is computed, as popularity_seller. In this example, the behaviors are assumed to be bookmarking and contact behaviors.

Computation of the seller's popularity value is performed using the following equation.

$$\text{Value} = \text{popularity\_goods} * w11 + \text{popularity\_seller} * w21$$

In the above equation, $w11$ and $w21$ are the corresponding weightings for popularity_goods and popularity_seller, respectively.

Because each user or seller can cause changes in the popularity values for various products, when determining the popularity values for products, the popularity values for the products can be multiplied by the corresponding time attenuation factors. Thus, the popularity values obtained have more meaning in practical applications. The changes in the popularity values for the various products can be due to such factors such as, for example, seasonal changes.

In step 604, the sector popularity values for each time period within a time window are summed up to obtain a popularity value for the information providing terminal.

In step 606, the network server retrieves a plurality of information providing terminals based on the popularity values of the information providing terminals to form a third data set S3. For example, a user's most preferred categories and corresponding preference values can be calculate. For example, category1, category2, category3, and the corresponding preference values value1, value2, value3 can be calculated. Since the popularity values of the seller (e.g. information providing terminals) have already been computed, according to this sorted list, and knowledge about which seller belongs to which categories, a sorted order of sellers based on popularity value for different categories can be computed. For each buyer, n1, n2, and n3 sellers are selected from categories 1, 2, and 3 to form the third data set S3, where n1=value1/(value1+value2+value3), n2=value2/(value1+value2+value3), and n3=value3/(value1+value2+value3).

In step 608, network server retrieves information of the plurality of information providing terminals from the third data set in sequence from the third data set according to the size of the seller's popularity values.

In step 610, the information of the retrieved information providing terminal of the third data set is added into the first information.

Additionally, because the above three data sets S1, S2 and S2 are sets of information providing terminals obtained based on the different focuses of the user terminals and the information providing terminals, the retrieval of the information of the plurality of information providing terminals from the three data sets for pushing to the corresponding user terminal may be as follows:

The corresponding percentages rat1, rat2, and rat3 predetermined for the first data set S1, the second data set S2, and the third data set S3 are separately multiplied by N to determine the number of client terminals for which information must be retrieved from each data set. The values of rat1, rat2, rat3 and N can be defined by an administrator.

The sum of percentages rat1, rat2 and rat3 is equal to 100% (rat1+rat2+rat3=100%). The percentages rat1, rat2, and rat3 differ in different recommendation scenarios depending on business needs. For example, if N sellers need to be recommended, then the information of the information providing terminal pushed corresponding to each data set is as follows:

N*rat1 sellers correspond to a number of successfully extracted sellers from the first data set S1. The number of successfully extracted sellers refers to an actual number of sellers extracted from the data set S1. For example, the original goal may be to obtain 10 successfully extracted sellers but the actual number of successfully extracted sellers can be only 6. If the specific number of sellers is insufficient, then the number of sellers is expressed as k1.

N*rat2 sellers correspond to a successively extracted number of sellers from the second data set S2. If the specific number of sellers is insufficient, then the number of sellers is expressed as k2.

N*rat3 sellers correspond to successively extracted number of sellers from the third data set S3. If the specific number of sellers is insufficient, then the number of sellers is expressed as k3.

If k1<N*rat1, then N*rat1−k1 sellers are extracted from the sellers in the second data set S2 that have not yet been extracted, and the number of sellers actually extracted is expressed as k4.

If k1+k2+k4<N*rat1+N*rat2, then N*rat1+N*rat2−k1−k2−k4 more sellers are then extracted from the third data set S3.

Figure 7:
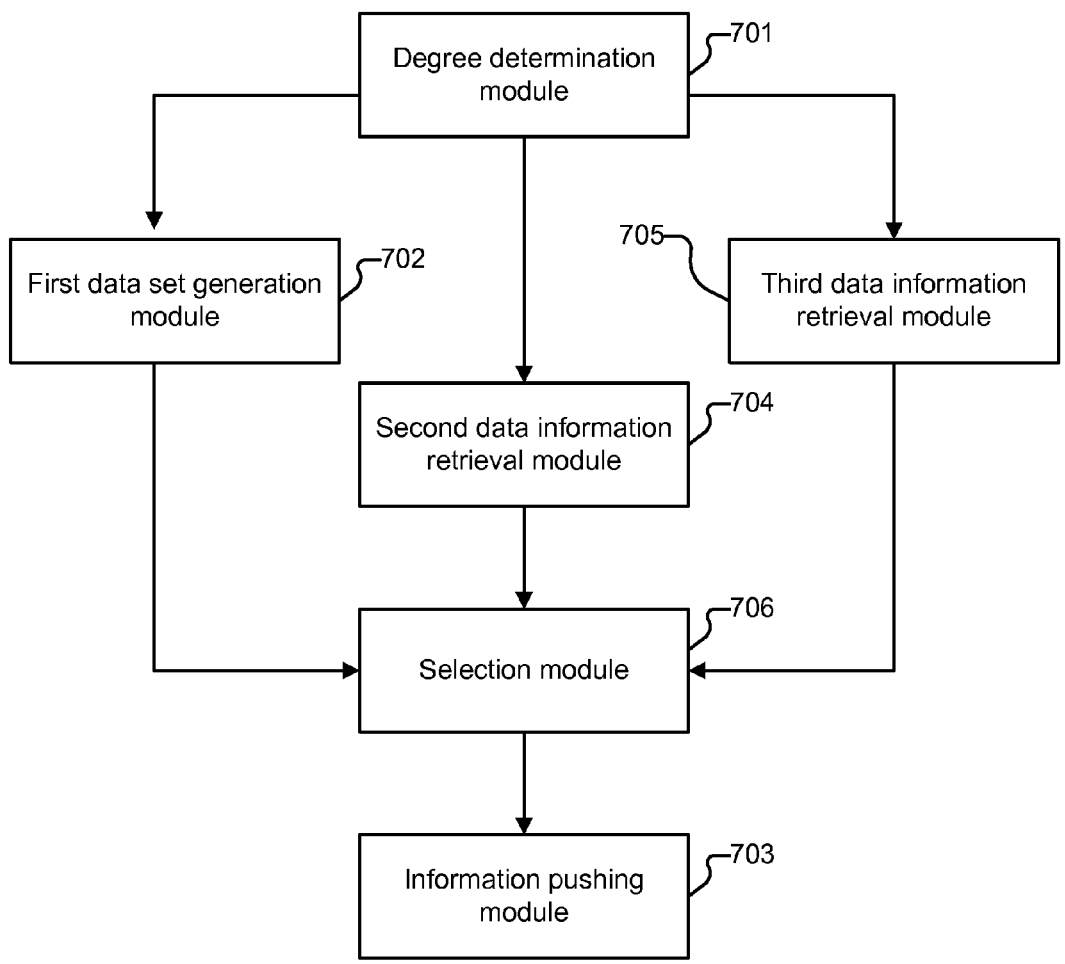
FIG. 7 is a structural schematic diagram of an embodiment of a personalized information pushing device.

FIG. 7 is a structural schematic diagram of an embodiment of a personalized information pushing device. As shown in FIG. 7, the device 700 includes:

A degree determination module 701 configured to retrieve network behavior data from access operations performed by a plurality of user terminals, and determine a numerical value of the degree of correlation between each user terminal and each information providing terminal having a correlation within a set time window based on the network behavior data.

A first data set generation module 702 is configured to retrieve a plurality of information providing terminals corresponding to a first user terminal based on numerical values of degrees of correlation between a first user terminal and the plurality of information providing terminals within a set time window to form a first data set S1.

An information pushing module 703 is configured to retrieve information relating to the plurality of information providing terminals from the first data set in sequence according to the size of the numerical values of the degrees of correlation to generate a first information, and push the retrieved first information to the first user terminal.

Each product belongs to a certain category. Therefore, all user behaviors with respect to products can be attributed to certain categories.

A second data information retrieval module 704 is configured to retrieve product information relating to the information providing terminals accessed by the plurality of user terminals, determine preferred categories and corresponding first numerical preference values for each user terminal based on the categories to which each product belongs to, determine the preferred categories and corresponding second numerical preference values for each information providing terminal based on the different categories to which the products provided by information providing terminals belong to and the quantity of products corresponding to each category, apply a relevance computation method to obtain a numerical relevance value between each user terminal and each information providing terminal based on the first and second numerical preference values, retrieve a plurality of information providing terminals to form a second data set S2 based on the numerical relevance values, retrieve information of the plurality of information providing terminals from the second data set in sequence according to the size of the numerical relevance values, and add the retrieved information of the information providing terminals of the second data set into the first information.

In a specific application, a shop's popularity value will also affect the selection of user terminals. Thus, in the event that related information is recommended to user terminals, it is also necessary to consider shop popularity values.

A third data information retrieval module 705 is configured to, after separately multiplying the number of occurrences of network behaviors from different sources by the corresponding weightings to obtain a result, multiply the results by time attenuation coefficients corresponding to the time periods to obtain sector popularity values for the information providing terminal within a time period based on the source method of the network behavior data of one information providing terminal, sum the sector popularity values for a plurality of time periods within a time window to obtain a popularity value for the information providing terminal, retrieve a plurality of information providing terminals to form a third data set S3 based on the popularity value of the information providing terminals, retrieve the information of the plurality of information providing terminals from the third data set in sequence according to the size of the popularity values, and add the retrieved information of the information providing terminal information into the first information.

Additionally, because the three data sets correspond to sets of information obtained based on different focuses of the user terminals and the information providing terminals, therefore, in the retrieval of the information of the plurality of information providing terminals from the three data sets for pushing to the corresponding user terminal, the device 700 can further include a selection module 706.

The selection module 706 is configured to separately multiply the corresponding percentages rat1, rat2, and rat3 predetermined for the first data set, the second data set, and the third data set by N to determine the number of client terminals for which information must be retrieved from each data set. The sum of the percentages rat1, rat2 and rat3 corresponds to 100%.

One or more of the above technical solutions of the embodiments of the present application have at least the following technical effects:

In the above method and device, a time window of fixed duration is set, and the data within this time window is analyzed. Therefore, only information generated by access by a user of the website during the fixed time duration is required to be saved and analyzed. Thus, the space used for data storage is reduced while also reducing the quantity of data to be analyzed. Accordingly, the efficiency of data analysis is increased.

Additionally, the effects of the network behavior on user selections are determined based on user network behavior and based on the timing of network behavior. Thereby, more accurate pushing of the information of information providing terminals to user terminals is enabled. Furthermore, the method disclosed in the present application is not limited to the recommendation of information in response to user input. Information can also be recommended to a user even when the user has not entered any keywords.

The system in the embodiment is described to include a number of units and subunits. The subunits/units can be implemented as software components executing on one or more processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The subunits/units may be implemented on a single device or distributed across multiple devices.

The method described in the present application is not limited to the specific embodiments described herein; other embodiments obtained by persons skilled in the art based on the technical scheme of the present application also lie within the scope of technical innovation of the present application.

Obviously, a person skilled in the art can modify and vary the present application without departing from the spirit and scope of the present invention. Thus, if these modifications to and variations of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A personalized information pushing method, wherein the method comprises:
retrieving network behavior data related to access operations performed by a plurality of user terminals;
determining a numerical value of a degree of correlation between a user terminal and a plurality of information providing terminals having a correlation with respect to the user terminal within a set time window based on the network behavior data, comprising:
determining a number of occurrences of each network behavior for one user terminal with respect to one information providing terminal in each predetermined time period within a set time window, based on network behavior data;
separately multiplying the number of occurrences of each network behavior by the corresponding behavior weighting to obtain a result;
multiplying the results by time attenuation coefficients corresponding to time periods to obtain a numerical value of a degree of correlation between the one user terminal and the one information providing terminal in one time period; and
summing the numerical values of the degrees of correlation between the one user terminal and the corresponding one information providing terminal for each predetermined time period within the set time window to obtain the numerical value of the degree of correlation between the one user terminal and the corresponding one information providing terminal;
retrieving a plurality of information providing terminals corresponding to a first user terminal of the plurality of the user terminals to form a first data set based on the numerical values of the degrees of correlation between the first user terminal and the information providing terminals within the set time window;
retrieving information of at least one of the plurality of information providing terminals from the first data set in sequence according to size of the numerical values of the degrees of correlation to generate first information; and
pushing the first information to the first user terminal.

2. The method as described in claim 1, wherein as the length of the interval between the time period and the current time increases, the corresponding attenuation coefficient becomes smaller.

3. The method as described in claim 1, wherein the retrieving information of at least one of the plurality of information providing terminals from the first data set further comprises:
retrieving information relating to the information providing terminals accessed by the plurality of user terminals;
determining preferred categories and corresponding first numerical preference value for each user terminal based on the categories to which each product belongs to;
determining the preferred categories and corresponding second numerical preference value for each information providing terminal based on the different categories to which the each product provided by the information providing terminals belongs to and the quantity of the each product corresponding to each category;
applying a relevance computation method to obtain a numerical relevance value between each user terminal and each information providing terminal based on the first and second numerical preference values;
retrieving a plurality of information providing terminals to form a second data set based on the numerical relevance values;
retrieving information of at least one of the plurality of information providing terminals from the second data set in sequence according to the size of the numerical relevance values; and
adding the retrieved information of at least one of the plurality of information providing terminals from the second data set into the first information.

4. The method as described in claim 3, wherein the retrieving information of at least one of the plurality of information providing terminals from the second data set further comprises:
after separately multiplying the number of occurrences of the each network behavior by the corresponding weighting, multiplying the results by the time attenuation coefficients corresponding to the time periods to obtain sector popularity values for the information providing terminal within a time period based on a source method of a network behavior data of one information providing terminal;
summing the sector popularity values for a plurality of time periods within a time window to obtain a popularity value for the one information providing terminal;
retrieving a plurality of information providing terminals to form a third data set based on the popularity values of the plurality of information providing terminals;
retrieving information of at least one of the plurality of information providing terminals from the third data set in sequence according to the size of the popularity values; and adding the retrieved information providing terminal information to the first information.

5. The method as described in claim 4, wherein retrieving the information of at least one of the plurality of information providing terminals in sequence according to the size of the numerical values of the degrees of correlation comprises separately multiplying the corresponding percentages rat1, rat2, and rat3 predetermined for the first data set, the second data set, and the third data set by N to determine the number of client terminals for which information must be retrieved from each data set, where a sum of rat1, rat2, and rat3 corresponds to 100%.

6. A personalized information pushing device, the device comprises:
   at least one processor configured to:
      retrieve network behavior data related to access operations performed by a plurality of user terminals;
      determine a numerical value of a degree of correlation between at least one user terminal and a plurality of information providing terminals having a correlation with respect to the at least one user terminal within a set time window based on the network behavior data, comprising:
         determine a number of occurrences of each network behavior for one user terminal with respect to one information providing terminal in each predetermined time period within a set time window, based on network behavior data;
         separately multiply the number of occurrences of each network behavior by the corresponding behavior weighting to obtain a result;
         multiply the results by time attenuation coefficients corresponding to time periods to obtain a numerical value of a degree of correlation between the one user terminal and the one information providing terminal in one time period; and
         sum the numerical values of the degrees of correlation between the one user terminal and the corresponding one information providing terminal for each predetermined time period within the set time window to obtain the numerical value of the degree of correlation between the one user terminal and the corresponding one information providing terminal;
      retrieve a plurality of information providing terminals corresponding to a first user terminal of the plurality of the user terminals to form a first data set based on the numerical values of the degrees of correlation between the first user terminal and the information providing terminals within the set time window;
      retrieve information of at least one of the plurality of information providing terminals from the first data set in sequence according to size of the numerical values of the degrees of correlation to generate a first information; and
      push the first information to the first user terminal; and
   a memory coupled to the at least one processor and configured to provide the at least one processor with instructions.

7. The device as described in claim 6, wherein the at least one processor is further configured to:
   retrieve information relating to the information providing terminals accessed by the plurality of user terminals;
   determine the preferred categories and a corresponding first numerical preference value for each user terminal based on categories to which each product belongs to;
   determine the preferred categories and a corresponding second numerical preference value for each information providing terminal based on the different categories to which the each product provided by the information providing terminals belongs to and the quantity of the each product corresponding to each category;
   apply a relevance computing method to obtain numerical relevance values between each user terminal and each information providing terminal based on the first and second numerical preference values;
   retrieve a plurality of information providing terminals to form a second data set based on the numerical relevance values;
   retrieve information of at least one of the plurality of information providing terminals from the second data set in sequence according to the size of the numerical relevance values; and
   add the retrieved information of at least one of the information providing terminals from the second data set into the first information providing terminal information.

8. The device as described in claim 7, wherein the at least one processor is further configured to:
   multiply the results by the time attenuation coefficients corresponding to the time periods to obtain sector popularity values for the information providing terminal within a time period based on a source method of network behavior data of one information providing terminal;
   sum the sector popularity values for a plurality of time periods within a time window to obtain a popularity value for the information providing terminal;
   retrieve a plurality of information providing terminals to form a third data set based on the popularity values of the plurality of information providing terminals;
   retrieve information of at least one of the plurality of information providing terminals from the third data set in sequence according to the size of the popularity values, and add the retrieved information of the information providing terminal from the third data set into the first information.

9. The device as described in claim 8 wherein the at least one processor is further configured to separately multiply the corresponding percentages rat1, rat2, and rat3 predetermined for the first data set, the second data set, and the third data set by N to determine the number of client terminals for which information must be retrieved from each data set, where a sum of rat1, rat2 and rat3 corresponds to 100%.

10. A computer program product for pushing personalized information, the computer program product being embodied in a non-transitory computer readable storage medium and comprising computer instructions for:
   retrieving network behavior data related to access operations performed by a plurality of user terminals;
   determining a numerical value of a degree of correlation between at least one user terminal and a plurality of information providing terminals having a correlation with respect to the at least one user terminal within a set time window based on the network behavior data comprising:
      determining a number of occurrences of each network behavior for one user terminal with respect to one information providing terminal in each predetermined time period within a set time window, based on network behavior data;
      separately multiplying the number of occurrences of each network behavior by the corresponding behavior weighting to obtain a result;
      multiplying the results by time attenuation coefficients corresponding to time periods to obtain a numerical value of a degree of correlation between the one user terminal and the one information providing terminal in one time period; and summing the numerical values of the degrees of correlation between the one user terminal and the corresponding one information providing terminal for each predetermined time period within the set time window to obtain the numerical value of the degree of correlation between the one user terminal and the corresponding one information providing terminal;

retrieving a plurality of information providing terminals corresponding to a first user terminal to form a first data set based on the numerical values of the degrees of correlation between the first user terminal and the information providing terminals within the set time window;

retrieving information of at least one of the plurality of information providing terminals from the first data set in sequence according to size of the numerical values of the degrees of correlation to generate a first information; and pushing the first information to the first user terminal.

11. The computer program product as described in claim 10, wherein as the length of the interval between the time period and the current time increases, the corresponding attenuation coefficient becomes smaller.

12. The computer program product as described in claim 10, wherein the retrieving information of at least one of the plurality of information providing terminals from the first data set further comprises:

retrieving product information from the access operations of the plurality of information providing terminals by the plurality of user terminals;

determining preferred categories and corresponding first numerical preference value for each user terminal based on the categories to which each product belongs to;

determining the preferred categories and corresponding second numerical preference value for each information providing terminal based on the different categories to which the information provided by the information providing terminals belongs to and the quantity of the each product corresponding to each category;

applying a relevance computation method to obtain a numerical relevance value between each user terminal and each information providing terminal based on the first and second numerical preference values;

retrieving a plurality of information providing terminals to form a second data set based on the numerical relevance values;

retrieving information of at least one of the plurality of information providing terminals from the second data set in sequence according to the size of the numerical relevance values; and adding the retrieved information of the information providing terminal from the second set into the first information.

13. The computer program product as described in claim 12, wherein the retrieving information of at least one of the plurality of information providing terminals from the second data set further comprises:

after separately multiplying the number of occurrences of the each network behavior by the corresponding weighting, multiplying the results by the time attenuation coefficients corresponding to the time periods to obtain sector popularity values for the information providing terminal within a time period based on a source method of a network behavior data of one information providing terminal;

summing the sector popularity values for a plurality of time periods within a time window to obtain a popularity value for the one information providing terminal;

retrieving a plurality of information providing terminals to form a third data set based on the popularity values of the plurality of information providing terminals;

retrieving information of at least one of the plurality of information providing terminals from the third data set in sequence according to the size of the popularity values; and adding the retrieved information providing terminal information to the first information.

14. The computer program product as described in claim 13, wherein retrieving the information of at least one of the plurality of information providing terminals in sequence according to the size of the numerical values of the degrees of correlation comprises separately multiplying the corresponding percentages rat1, rat2, and rat3 predetermined for the first data set, the second data set, and the third data set by N to determine the number of client terminals for which information must be retrieved from each data set, where a sum of rat1, rat2, and rat3 corresponds to 100%.

15. A personalized information pushing method, wherein the method comprises:

retrieving network behavior data related to access operations performed by a plurality of user terminals;

determining a numerical value of a degree of correlation between a user terminal and a plurality of information providing terminals having a correlation with respect to the user terminal within a set time window based on the network behavior data;

retrieving a plurality of information providing terminals corresponding to a first user terminal of the plurality of the user terminals to form a first data set based on the numerical values of the degrees of correlation between the first user terminal and the information providing terminals within the set time window;

retrieving information of at least one of the plurality of information providing terminals from the first data set in sequence according to size of the numerical values of the degrees of correlation to generate first information, comprising:

retrieving information relating to the information providing terminals accessed by the plurality of user terminals;

determining preferred categories and corresponding first numerical preference value for each user terminal based on the categories to which each product belongs to;

determining the preferred categories and corresponding second numerical preference value for each information providing terminal based on the different categories to which the each product provided by the information providing terminals belongs to and the quantity of the each product corresponding to each category;

applying a relevance computation method to obtain a numerical relevance value between each user terminal and each information providing terminal based on the first and second numerical preference values;

retrieving a plurality of information providing terminals to form a second data set based on the numerical relevance values;

retrieving information of at least one of the plurality of information providing terminals from the second data set in sequence according to the size of the numerical relevance values; and adding the retrieved information of at least one of the plurality of information providing terminals from the second data set into the first information; and pushing the first information to the first user terminal.

16. A personalized information pushing device, the device comprises:

at least one processor configured to:
retrieve network behavior data related to access operations performed by a plurality of user terminals;
determine a numerical value of a degree of correlation between at least one user terminal and a plurality of information providing terminals having a correlation with respect to the at least one user terminal within a set time window based on the network behavior data;
retrieve a plurality of information providing terminals corresponding to a first user terminal of the plurality of the user terminals to form a first data set based on the numerical values of the degrees of correlation between the first user terminal and the information providing terminals within the set time window;
retrieve information of at least one of the plurality of information providing terminals from the first data set in sequence according to size of the numerical values of the degrees of correlation to generate a first information, comprising:
retrieve information relating to the information providing terminals accessed by the plurality of user terminals;
determine preferred categories and corresponding first numerical preference value for each user terminal based on the categories to which each product belongs to;
determine the preferred categories and corresponding second numerical preference value for each information providing terminal based on the different categories to which the each product provided by the information providing terminals belongs to and the quantity of the each product corresponding to each category;
apply a relevance computation method to obtain a numerical relevance value between each user terminal and each information providing terminal based on the first and second numerical preference values;
retrieve a plurality of information providing terminals to form a second data set based on the numerical relevance values;
retrieve information of at least one of the plurality of information providing terminals from the second data set in sequence according to the size of the numerical relevance values; and
add the retrieved information of at least one of the plurality of information providing terminals from the second data set into the first information; and
push the first information to the first user terminal; and a memory coupled to the at least one processor and configured to provide the at least one processor with instructions.

17. A computer program product for pushing personalized information, the computer program product being embodied in a non-transitory computer readable storage medium and comprising computer instructions for:

retrieving network behavior data related to access operations performed by a plurality of user terminals;
determining a numerical value of a degree of correlation between at least one user terminal and a plurality of information providing terminals having a correlation with respect to the at least one user terminal within a set time window based on the network behavior data;
retrieving a plurality of information providing terminals corresponding to a first user terminal to form a first data set based on the numerical values of the degrees of correlation between the first user terminal and the information providing terminals within the set time window;
retrieving information of at least one of the plurality of information providing terminals from the first data set in sequence according to size of the numerical values of the degrees of correlation to generate a first information, comprising:
retrieving information relating to the information providing terminals accessed by the plurality of user terminals;
determining preferred categories and corresponding first numerical preference value for each user terminal based on the categories to which each product belongs to;
determining the preferred categories and corresponding second numerical preference value for each information providing terminal based on the different categories to which the each product provided by the information providing terminals belongs to and the quantity of the each product corresponding to each category;
applying a relevance computation method to obtain a numerical relevance value between each user terminal and each information providing terminal based on the first and second numerical preference values;
retrieving a plurality of information providing terminals to form a second data set based on the numerical relevance values;
retrieving information of at least one of the plurality of information providing terminals from the second data set in sequence according to the size of the numerical relevance values; and
adding the retrieved information of at least one of the plurality of information providing terminals from the second data set into the first information; and pushing the first information to the first user terminal.

* * * * *